(12) United States Patent
Kim et al.

(10) Patent No.: US 11,385,425 B2
(45) Date of Patent: Jul. 12, 2022

(54) OPTICAL MODULE ASSEMBLY

(71) Applicant: SOLiD, INC., Seongnam-si (KR)

(72) Inventors: Tae Ho Kim, Yongin-si (KR); In Ju Lee, Anyang-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 17/140,303

(22) Filed: Jan. 4, 2021

(65) Prior Publication Data
US 2021/0231893 A1    Jul. 29, 2021

(30) Foreign Application Priority Data

Jan. 3, 2020  (KR) .................. 10-2020-0000980

(51) Int. Cl.
*G02B 6/42*      (2006.01)
*G02B 6/38*      (2006.01)
*F21V 8/00*      (2006.01)

(52) U.S. Cl.
CPC .......... *G02B 6/4292* (2013.01); *G02B 6/3807* (2013.01); *G02B 6/3897* (2013.01); *G02B 6/0016* (2013.01); *G02B 6/0083* (2013.01); *G02B 6/3825* (2013.01); *G02B 6/3879* (2013.01); *G02B 6/3893* (2013.01)

(58) Field of Classification Search
CPC .. G02B 6/3807; G02B 6/3825; G02B 6/3847; G02B 6/3879; G02B 6/3893; G02B 6/3897; G02B 6/4246; G02B 6/4292
See application file for complete search history.

(56) References Cited

U.S. PATENT DOCUMENTS

| 7,090,527 | B2* | 8/2006 | Hanley | G02B 6/4292 439/372 |
| 7,448,810 | B2* | 11/2008 | Ko | G02B 6/3849 385/139 |
| 7,699,536 | B2* | 4/2010 | Yoshikawa | G02B 6/4246 385/92 |
| 8,083,547 | B2* | 12/2011 | Roth | H01R 13/62938 439/607.23 |

(Continued)

FOREIGN PATENT DOCUMENTS

| GB | 2 179 506 A | 3/1987 |
| JP | 2014-203055 A | 10/2014 |
| JP | 2017-134401 A | 8/2017 |

OTHER PUBLICATIONS

Extended European Search Report dated May 21, 2021 in European Application No. 20217843.0.

*Primary Examiner* — Daniel Petkovsek
(74) *Attorney, Agent, or Firm* — Sughrue Mion, PLLC

(57) ABSTRACT

Provided is an optical module assembly including: an optical module body in which an optical transceiver is built; a first connector coupled to one side of the optical module body to be connected to an optical transceiver in the optical module body; a second connector, in which an insertion hole for inserting an optical cable is formed and the optical cable is inserted into the insertion hole, connected to the first connector to connect the optical cable to the optical transceiver connected to the first connector; and a disconnection unit installed on the first connector and the second connector to release the connection between the first connector and the second connector by rotation.

6 Claims, 3 Drawing Sheets

(56) References Cited

U.S. PATENT DOCUMENTS

| | | | |
|---|---|---|---|
| 8,537,558 B2* | 9/2013 | Su | H01R 13/6658 361/747 |
| 9,277,673 B2* | 3/2016 | Droesbeke | G02B 6/4269 |
| 2009/0191738 A1 | 7/2009 | Kadar-Kallen et al. | |
| 2010/0209112 A1* | 8/2010 | Chou | H04B 10/40 398/135 |
| 2016/0266329 A1 | 9/2016 | Rossi et al. | |

* cited by examiner

OPTICAL MODULE ASSEMBLY

CROSS-REFERENCE TO RELATED APPLICATION

This application claims the benefit of Korean Patent Application No. 10-2020-0000980, filed on Jan. 3, 2020, in the Korean Intellectual Property Office, the disclosures of which are incorporated herein in its entirety by reference.

BACKGROUND

1. Field

The present disclosure relates to an optical module assembly, and more particularly, to an optical module assembly capable of preventing contamination or damage of a connection portion of an optical cable due to separation of the optical cable by enabling disconnection of an optical module without separating the optical module and the optical cable.

2. Description of the Related Art

In general, an optical module refers to a module that accommodates various optical communication functions in one package to enable connection with an optical fiber. Recently, a bidirectional optical module is mainly used, wherein an optical transmitter, which uses a laser diode that consume less power and can be used over long distances as a light source, and an optical receiver for optical communication using a photodiode are modularized into one.

The bidirectional optical module includes an optical transmitter, an optical receiver, an optical filter, and a connector. In addition, an isolator is installed to prevent characteristics of the laser diode from becoming unstable due to reflected noise.

Among them, the connector serves to be optically coupled with an optical cable inserted from the outside. However, because the connector includes a metal material, external electro static discharge (ESD) may be introduced through the connector to affect a device in the optical module (e.g., a laser diode of the optical transmitter).

In addition, because the optical fiber includes glass fibers of the thickness of a hair, it is physically very weak. In particular, a connection portion of the optical cable is a portion to which the optical fiber is exposed and has a property that is very vulnerable to vibration and impact.

Conventionally, the optical module and the optical cable are separated from each other in order to disconnect the optical module. Accordingly, there is a problem in that the connection portion of the separated optical cable is exposed to the surrounding environment, and is contaminated with surrounding foreign substances or damaged by external impact.

SUMMARY

Provided are optical module assemblies capable of preventing contamination or damage of a connection portion of an optical cable due to separation of the optical cable by enabling disconnection of an optical module without separating the optical cable.

According to an aspect of the disclosure, an optical module assembly comprises an optical module body in which an optical transceiver is built, a first connector coupled to one side of the optical module body to be connected to an optical transceiver in the optical module body, a second connector, in which an insertion hole for inserting an optical cable is formed and the optical cable is inserted into the insertion hole, connected to the first connector to connect the optical cable to the optical transceiver connected to the first connector, and a disconnection unit installed on the first connector and the second connector to release the connection between the first connector and the second connector by rotation.

According to an exemplary embodiment, the optical module assembly further comprises an engaging member formed on the optical cable, a coupling-engaging groove formed in the first connector, into which the engaging member is inserted, and a release-engaging groove formed in the second connector, into which the engaging member is inserted, wherein the engaging member of the optical cable is inserted into the coupling-engaging groove of the first connector when the first connector is connected to the second connector, and is inserted into the release-engaging groove of the second connector when the first connector is disconnected from the second connector.

According to an exemplary embodiment, the engaging member of the optical cable comprises a coupling belt formed to protrude to the outside of the optical cable, and a coupling block formed to extend to a side surface of the coupling belt, wherein the coupling belt is formed to be movable toward the optical cable, and when the coupling belt moves toward the optical cable, the coupling block is arranged adjacent to the optical cable.

According to an exemplary embodiment, the optical module assembly further comprises a guide groove formed in the first connector, and a guide formed in the second connector, inserted into the guide groove, and slidably moved along the guide groove, wherein the second connector is slidably moved according to the movement of the guide to be connected to or disconnected from the first connector.

According to an exemplary embodiment, the disconnection unit comprises a first rotation protrusion protruding from the first connector, a rotation link whose one side is rotatably coupled to the first rotation protrusion to rotate around the first rotation protrusion, and a second rotation protrusion formed to protrude from the guide of the second connector and to which the other side of the rotation link is rotatably coupled.

According to an exemplary embodiment, the optical module assembly further comprises a coupling hole formed on the other side of the rotation link so that the second rotation protrusion is inserted, wherein the coupling hole is formed to have a greater width than the second rotation protrusion.

According to an exemplary embodiment, the optical module assembly further comprises a fixing block installed to be slidably movable to the first connector and fixed to be partially inserted into the optical module body by the sliding movement, and a fixing rod formed to extend from the one end of the rotation link and installed to be partially inserted into the fixing block.

DETAILED DESCRIPTION

Figure 1:
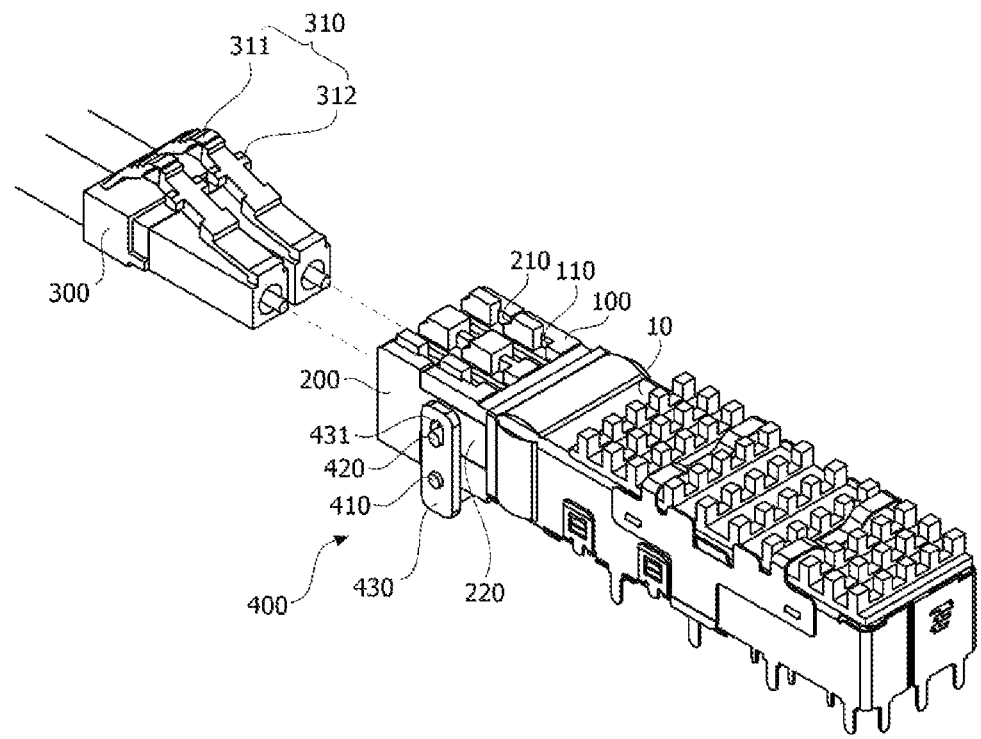
FIG. 1 is a perspective view of an optical module assembly according to the disclosure.

Specific structural or functional descriptions for embodiments according to the disclosure disclosed herein are merely illustrative for the purpose of illustrating embodiments according to the disclosure. The embodiments according to the disclosure may be implemented in various forms and are not limited to the embodiments described herein.

The embodiments according to the disclosure may be variously modified and have various forms, so that the embodiments are illustrated in the drawings and described in detail herein. However, this does not limit the disclosure within specific embodiments and it should be understood that the disclosure covers all the modifications, equivalents, and replacements within the idea and technical scope of the disclosure.

It will be understood that, although the terms first, second, etc. may be used herein to describe various elements, these elements should not be limited by these terms. These terms are only used to distinguish one element from another. For example, as long as within the scope of the disclosure, a first element may be named as a second element, and a second element may be named as a first element.

Further, if it is described that one element "is connected to" or "accesses" the other element, it is understood that the one element may be directly connected to or may directly access the other element but unless explicitly described to the contrary, another element may be "connected" or may "access" between the elements. However, if it is described that one element "is directly connected to" or "directly accesses" the other element, it is understood that there are no other elements exists between them. Other expressions that describe the relationship between elements, such as "between" and "directly between" or "adjacent to" and "directly adjacent to" should be understood as above.

The terms used in this application, only certain embodiments have been used to describe, is not intended to limit the disclosure. An expression used in the singular encompasses the expression of the plural, unless it has a clearly different meaning in the context. Also, it will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an optical module assembly according to preferred embodiments of the disclosure will be described in detail with reference to the accompanying drawings.

As shown in FIGS. 1 to 5, the optical module assembly according to the disclosure includes an optical module main body 10 in which an optical transceiver (not shown) is built, a first connector 100 coupled to one side of the optical module body 10 to be connected to the optical transceiver in the optical module body 10, a second connector 200 in which an insertion hole into which an optical cable 300 is inserted is formed, and the optical cable 300 is inserted into the insertion hole, the second connector 200 being connected to the first connector 100 to connect the optical cable 300 to the optical transceiver connected to the first connector 100A, and a disconnection unit 400 installed on the first connector 100 and the second connector 200 to release the connection between the first connector 100 and the second connector 200 by rotation.

First, the optical module body 10 is a general optical module, and an optical transceiver and an optical filter are built therein. The optical module body 10 may convert an electrical signal into an optical signal and convert an optical signal into an electrical signal between an optical cable connecting an optical communication network and a transmission device for transmitting data. Because the optical module main body 10 is a known technology widely used in the related art, a detailed description will not be given herein.

The first connector 100 is a member formed in a substantially rectangular box shape, and is installed to be fixedly coupled to one side of the optical module body 10. In this case, the first connector 100 is installed to be connected to the optical transceiver (not shown) in the optical module main body 10, and a connection terminal (not shown) connected to the optical transceiver is built in the first connector 100. The above-described connection terminal is coupled with a connection terminal of the optical cable 300 to be described later below, whereby the optical cable 300 is connected to the optical module body 10. In addition, a guide groove 120 for inserting a guide 220 of the second connector 200 to be described later below is formed on both sides of the first connector 100. In the present embodiment, the first connector 100 is described as a member formed in a substantially rectangular box shape, but the disclosure is not necessarily limited thereto, and may include all various shapes.

The second connector 200 is a member formed in a substantially rectangular box shape to correspond to the first connector 100 and is installed to be connected to the first connector 100. An insertion hole for inserting the optical cable 300 is formed in the second connector 200, and the optical cable 300 may be inserted into the insertion hole. At this time, the connection terminal of the optical cable 300 is inserted into a connection terminal of the first connector 100 so that the optical cable 300 is connected to the optical module body 10. The guide 220 is formed on both sides of the second connector 200, and the first connector 100 is connected to the second connector 200 by mutual coupling between the guide 220 of the second connector 200 and the guide groove 120 of the first connector 100. The guide 220 is formed in a shape corresponding to the guide groove 120 and is installed in a shape to be inserted into the guide groove 120, and is installed to be slidably moved along the guide groove 120. As described above, because the guide 220 is slidable along the guide groove 120, the second connector 200 connected to the guide 220 is also slidable in a direction in which the guide 220 moves, so that connection or disconnection with the first connector 100 is possible.

In addition, an engaging member 310 may be formed on the optical cable 300. The engaging member 310 includes a coupling belt 311 formed to protrude to the outside of the optical cable 300 and a coupling block 312 formed to extend to the side of the coupling belt 311. The coupling belt 311 is a strip-shaped belt having a certain thickness and may be formed to protrude to the outside of the optical cable 300. The coupling belt 311 may be formed in a state in which one side is coupled to the optical cable 300 and the other side is not coupled. That is, the other side of the coupling belt 311 may be freely moved by an external force while the degree of freedom is guaranteed. The coupling block 312 is a block-shaped member having a certain thickness, and is formed to extend to both sides of the coupling belt 311 in a central portion of the coupling belt 311. The coupling block 312 may be adjacent to or apart from the optical cable 300 according to an external force applied to the coupling belt 311.

The disclosure may further include a coupling-engaging groove 110 formed in the first connector 100 and a release-engaging groove 210 formed in the second connector 200.

The coupling-engaging groove 110 is formed on an upper surface of the first connector 100 and is formed to correspond to the coupling block 312 of the optical cable 300 so that the coupling block 312 may be inserted.

In addition, the release-engaging groove 210 is formed on an upper surface of the second connector 200 and is formed to correspond to the coupling block 312 of the optical cable 300 so that the coupling block 312 may be inserted.

When the coupling belt 311 is pressed by applying an external force to the coupling belt 311 of the optical cable 300, the coupling block 312 is located adjacent to the optical cable 300, so that the optical cable 300 is horizontally movable on the second connector 200. When the external force applied to the coupling belt 311 of the optical cable 300 is removed, the coupling belt 311 protrudes to the outside of the optical cable 300 so that the coupling block 312 is caught in the coupling-engaging groove 110 or the release-engaging groove 210 to fix the optical cable 300.

The coupling block 312 of the optical cable 300 is inserted into the coupling-engaging groove 110 when the first connector 100 is connected to the second connector 200, and is inserted into the release-engaging groove 210 when the first connector 100 is disconnected from the second connector 200.

In addition, the disconnection unit 400 includes a first rotation protrusion 410 protruding from the first connector 100, a rotation link 430 that is coupled to the first rotation protrusion 410 so that one side thereof is rotatable, and rotates around the first rotation protrusion 410, and a second rotation protrusion 420 formed to protrude from the guide 220 of the second connector 200 and to which the other side of the rotation link 430 is rotatably coupled.

The first rotation protrusion 410 is a circular rod-shaped protrusion having a certain diameter, and is formed to protrude outward from a side surface of the first connector 100.

In addition, the second rotation protrusion 420 is a circular rod-shaped protrusion having a certain diameter, and is formed to protrude outward from a side surface of the guide 220 of the second connector 200. At this time, the second rotation protrusion 420 is arranged parallel to the first rotation protrusion 410.

The rotation link 430 is a bar-shaped structure having a certain thickness, and one side thereof is rotatably coupled to the first rotation protrusion 410. At this time, a coupling hole 431 is formed on the other side of the rotation link 430, and the second rotation protrusion 420 is inserted into the coupling hole 431. The coupling hole 431 is formed to have a greater width than the second rotation protrusion 420, whereby the other side of the rotation link 430 is also rotatably coupled to the second rotation protrusion 420.

The first rotation protrusion 410, the second rotation protrusion 420, and the rotation link 430 may be provided in pairs and may be installed on both sides of the first connector 100 and the second connector 200, respectively.

The disclosure further includes a fixing block 440 installed to be slidably movable to the first connector 100 and fixed to be partially inserted into the optical module body 10 by the sliding movement, and a fixing rod 432 formed to extend from the end of the one side of the rotation link 430 and installed to be partially inserted into the fixing block 440.

The fixing block 440 is a member of a substantially rectangular box shape in which an engaging groove for inserting the fixing rod 432 is formed on one side, and is installed below the first connector 100 so as to be slidable in a direction of arrow A in FIG. 5. The fixing block 440 may be moved toward the optical module body 10 according to the sliding movement, and may be inserted and fixed below the optical module body 10.

The fixing rod 432, which is a circular rod having a certain diameter, is installed to connect the ends of the one side of the pair of rotation links 430 to each other, and a central portion of the fixing rod 432 is installed to be inserted into the engaging groove of the fixing block 440.

The operation of the optical module assembly according to the disclosure configured as described above will be described in detail with reference to FIGS. 1 to 5.

First, FIG. 1 is a view illustrating before the optical module body 10 and the optical cable 300 of the disclosure are connected to each other. In this state, the optical cable 300 is inserted into and coupled to the insertion hole of the second connector 200.

Figure 2:
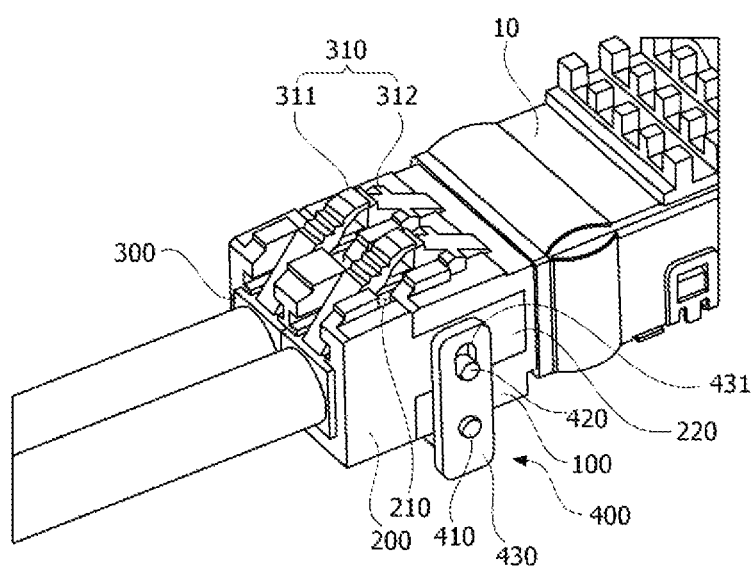
FIG. 2 is a partial perspective view illustrating a state in which a first connector and a second connector of an optical module assembly according to the disclosure are connected to each other.

FIG. 2 is a view illustrating a state in which the optical cable 300 is inserted into the insertion hole of the second connector 200, and the optical module body 10 and the optical cable 300 are connected to each other. In this state, the coupling block 312 of the optical cable 300 is located to be caught in the coupling-engaging groove 110 of the first connector 100.

Figure 3:
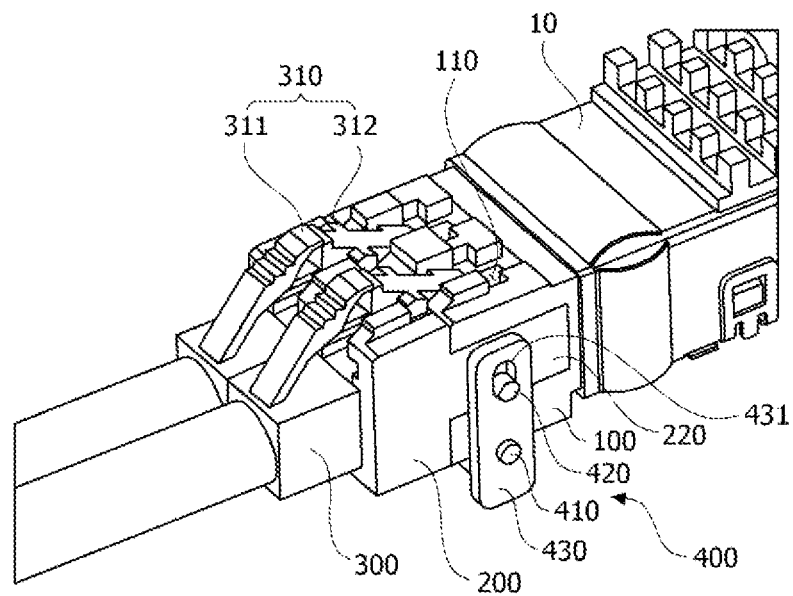
FIG. 3 is a partial perspective view illustrating a state in which a coupling block of an optical cable of an optical module assembly according to the disclosure is inserted into a release-engaging groove of a second connector.

FIG. 3 is a view illustrating a first operation for separating the optical cable 300 and the optical module body 10. After the coupling block 312 of the optical cable 300 is located in the release-engaging groove 210 of the second connector 200, the optical cable 300 is moved by a certain interval in the left direction of FIG. 3.

Figure 4:
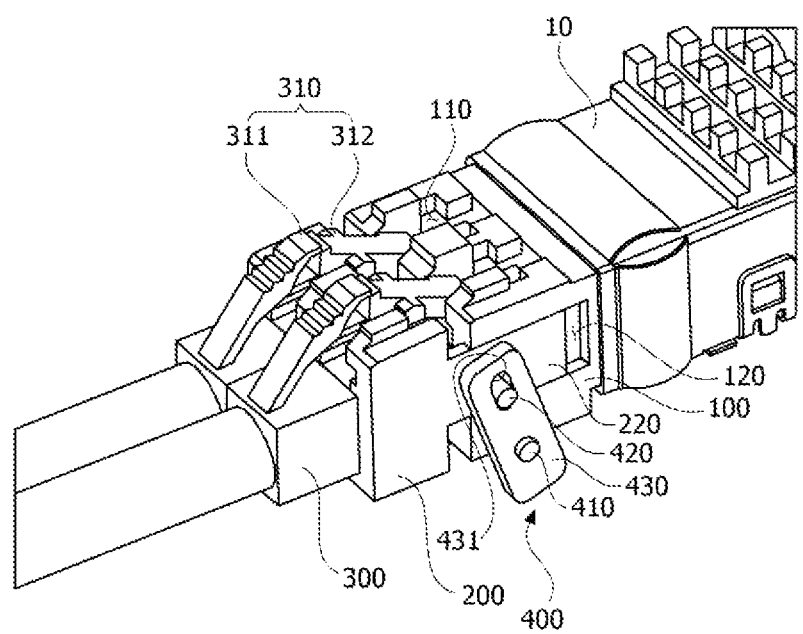
FIGS. 4 and 5 are partial perspective views illustrating a state in which a first connector and a second connector of an optical module assembly according to the disclosure are disconnected from each other.

Thereafter, as shown in FIG. 4, the rotation link 430 is rotated to the left of FIG. 4 to slide the second connector 200 to the left of FIG. 4. When the second connector 200 slides toward the left side of FIG. 4 as described above, the connection terminal of the optical cable 300 is separated from the connection terminal in the first connector 100, so that the connection between the optical module body 10 and the optical cable 300 is released.

Figure 5:
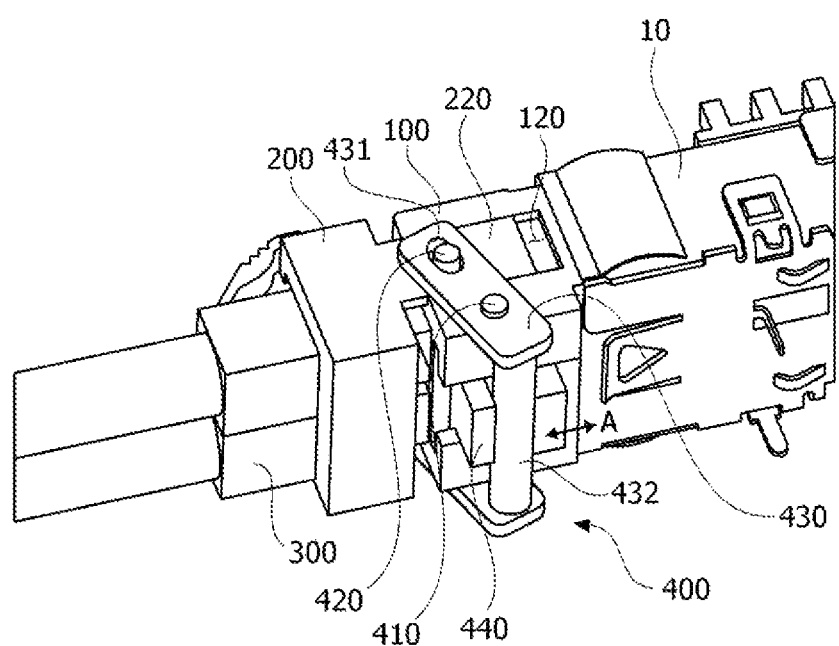

FIG. 5 is a view illustrating the state of FIG. 4 from a different angle. When the rotation link 430 is rotated, accordingly, the fixing block 440 is moved in the direction of arrow A in FIG. 5 so that a portion of the fixing block 440 is inserted and fixed below the optical module body 10.

The optical module assembly according to the disclosure configured and operated as described above enables disconnection of the optical module body 10 and the optical cable 300 without separating the optical cable 300, thereby preventing contamination or damage of a connection portion of the optical cable 300 due to the separation of the optical cable 300 in advance.

According to the disclosure, it is possible to disconnect an optical module without separating an optical cable, thereby preventing contamination or damage of a connection portion of the optical cable due to the separation of the optical cable.

It should be understood that the above-described embodiments are illustrative in all respects and not limiting, and the scope of the disclosure will be indicated by the claims to be described later below rather than the detailed description described above. Also, it should be construed that the meaning and scope of the claims, and further all modifications and variations derived from the equivalent concept are included in the scope of the disclosure.

The invention claimed is:

1. An optical module assembly comprising:
    an optical module body;
    a first connector coupled to one side of the optical module body to be connected to the optical module body;
    a second connector, in which an insertion hole for inserting an optical cable is formed and the optical cable is inserted into the insertion hole, connected to the first connector to connect the optical cable to the optical module body connected to the first connector; and
    a disconnection unit installed on the first connector and the second connector to release the connection between the first connector and the second connector by rotation,
    wherein the optical module assembly further comprises:
    an engaging member formed on the optical cable;
    a coupling-engaging groove formed in the first connector, into which the engaging member is inserted; and
    a release-engaging groove formed in the second connector, into which the engaging member is inserted,
    wherein the engaging member of the optical cable is:
    inserted into the coupling-engaging groove of the first connector when the first connector is connected to the second connector, and
    inserted into the release-engaging groove of the second connector when the first connector is disconnected from the second connector.

2. The optical module assembly of claim 1, wherein the engaging member of the optical cable comprises:
    a strip shaped belt formed to protrude to the outside of the optical cable; and
    a coupling block formed to extend to a side surface of the strip shaped belt,
    wherein the strip shaped belt is formed to be movable toward the optical cable, and when the strip shaped belt moves toward the optical cable, the coupling block is arranged adjacent to the optical cable.

3. The optical module assembly of claim 1, further comprising:
    a guide groove formed in the first connector; and
    a guide formed in the second connector, inserted into the guide groove, and slidably moved along the guide groove,
    wherein the second connector is slidably moved according to the movement of the guide to be connected to or disconnected from the first connector.

4. The optical module assembly of claim 3, wherein the disconnection unit comprises:
    a first rotation protrusion protruding from the first connector;
    a rotation link whose one side is rotatably coupled to the first rotation protrusion to rotate around the first rotation protrusion; and
    a second rotation protrusion formed to protrude from the guide of the second connector and to which the other side of the rotation link is rotatably coupled.

5. The optical module assembly of claim 4, further comprising:
    a coupling hole formed on the other side of the rotation link so that the second rotation protrusion is inserted,
    wherein the coupling hole is formed to have a greater width than the second rotation protrusion.

6. The optical module assembly of claim 4, further comprising:
    a fixing block installed to be slidably movable to the first connector and fixed to be partially inserted into the optical module body by the sliding movement; and
    a fixing rod formed to extend from the one end of the rotation link and installed to be partially inserted into the fixing block.

* * * * *